3,544,337
SELF-PRESERVING BANANA PASTE

Robert H. Bundus, Chicago, Ill., assignor to Beatrice Foods Co., Chicago, Ill., a corporation of Delaware
No Drawing. Filed Jan. 5, 1967, Ser. No. 607,396
Int. Cl. A23l *1/06*
U.S. Cl. 99—102             3 Claims

ABSTRACT OF THE DISCLOSURE

A self-preserving banana paste is prepared by mixing banana powder, banana puree and sugar at a temperature sufficient to destroy yeasts and molds and either (1) packaging hot, followed by cooling in a sealed container, or (2) cooling and filling and sealing aseptically.

---

The present application is related to Bundus application Ser. No. 381,527, now abandoned, filed July 9, 1964.

The present invention relates to a self-preserving banana paste.

The conventional manner of achieving a self-preserving concentration of a banana paste is to concentrate the banana puree by vacuum concentration at elevated temperatures. This procedure results in substantial flavor loss.

Accordingly, it is an object of the present invention to develop an improved method of preparing a banana paste.

Another object is to prepare a banana paste without substantial flavor loss.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the objects can be attained by mixing banana powder, banana puree and sugar to prepare a banana paste possessing fresh banana puree flavor. The mixture is prepared at a temperature sufficient to destroy yeasts and molds and is then packaged hot. Next it is either cooled in a sealed container or is cooled, filled into a container and sealed aseptically.

As the banana powder there can be used banana powder prepared in accordance with Aguirre Patent 3,259,508. Preferably, however, the Aguirre procedure is modified as set forth in Bundus application Ser. No. 381,527, filed July 9, 1964, to prepare a banana powder containing 2.5 to 3.5% moisture. Most preferably, the banana powder employed contains 2.5% moisture.

The banana puree can be prepared by any conventional fashion, e.g., in the manner shown by Aguirre.

Unless otherwise indicated, all parts and percentages are by weight.

EXAMPLE 1

Five pounds of banana puree containing 25% solids were heated to 230° F. for 45 seconds. While the puree was hot, there were blended continuously therewith 2.6 pounds of banana powder (containing 2.5% moisture) and 2.78 pounds of can sugar. The hot mixture was filled into plastic pouches at 180° F. which were than sealed and cooled. The product had 63.4% total solids. As the plastic pouches there were employed saran coated polyethylene pouches (vinylidene chloride-acrylonitrile copolymer (85:15) coated polyethylene). Other plastic pouches can be employed such as pouches of nylon coated polyethylene, or vinyl chloride polymer or there can be used glass containers or polyethylene terephthalate bags.

The sucrose and banana solids are added to the puree in an amount of obtain a paste containing 60 to 65% total solids.

The sugar and banana solids are added to the puree to obtain a sugar to water ratio in the final product of 58:62%, preferably 60% of sucrose.

The 10.38 pounds of banana paste prepared in the example when reconstituted with 3.6 pounds of water gives a puree containing 31.77% of total solids of which 25% is banana solids and 6.7% is added sugar.

EXAMPLE 2

Five pounds of banana puree containing 25% solids were heated to 230° F. for 30 seconds. While the puree was hot, there were continuously blended therewith 5.93 pounds of banana powder (containing 2.0% of moisture). The hot mixture was filled into plastic pouches at 190° F., which were then sealed and cooled. The product had 63% total solids and a sugar to water ratio of 57.9% sugar to 42.1% water.

EXAMPLE 3

Five pounds of banana puree containing 25% solids were heated to 230° F. for 15 seconds. While the puree was hot, there were continuously blended therewith 7.0 pounds of banana powder (containing 1.5% moisture). The hot mixture was filled into plastic pouches at 175° F. The pouches were then sealed and cooled. The product had 67.5% total solids and a sugar to water ratio of 60.5% sugar to 39.5% water. The preferred product is that of Example 1.

It is desirable to maintain the percent of banana puree solids in the paste as high as possible so that on reconstitution the product is as near a banana puree as possible. The sugar is employed for self-preservation of the paste.

The banana powder added should be kept at a minimum to obtain the greatest amount of puree which is the primary source of fresh banana flavor. However, the banana powder is essential to get the requisite solids content.

The heating to kill yeasts and molds can be accomplished at 200 to 250° F. at times of 120 to 15 seconds. The hot filling further insures against yeast and mold contamination.

The amount of added sugar based on the total solids is 40% to 50%.

It is desirable that the sugar to water ratio be 57 to 62% sugar and 43 to 38% water in the paste.

What is claimed is:

1. A process of preparing a banana paste the steps of heating banana puree at a time and temperature sufficient to destroy yeasts and molds, adding sufficient banana powder and sugar to provide a paste of 60 to 65% total solids and aseptically filling the mixture into a container, the amount of sugar being 40 to 50% of the total solids and the water being 38 to 43% of the sugar.

2. A process according to claim 1 wherein the banana powder and sugar are added and the filling is accomplished at a temperature of at least 140° F.

3. A process according to claim 1 wherein the heating is at a temperature of at least 200° F.

References Cited

UNITED STATES PATENTS

| | | | |
|---|---|---|---|
| 2,118,391 | 5/1938 | Allain et al. | 99—100 |
| 2,592,332 | 4/1952 | Reale | 99—102 XR |
| 2,647,838 | 8/1953 | Stone | 99—102 XR |

MAURICE W. GREENSTEIN, Primary Examiner

J. M. HUNTER, Assistant Examiner

U.S. Cl. X.R.

99—154